US011731525B1

(12) United States Patent
Cong

(10) Patent No.: US 11,731,525 B1
(45) Date of Patent: Aug. 22, 2023

(54) SYSTEM AND METHOD FOR OBJECT ALIGNMENT AND PAIRING

(71) Applicant: Clearpoint Ventures LLC, San Jose, CA (US)

(72) Inventor: Daniel Cong, Santa Rosa, CA (US)

(73) Assignee: Clearpoint Ventures LLC, San Jose, CA (US)

( * ) Notice: Subject to any disclaimer, the term of this patent is extended or adjusted under 35 U.S.C. 154(b) by 7 days.

(21) Appl. No.: 17/505,281

(22) Filed: Oct. 19, 2021

(51) Int. Cl.
  *B60L 53/37* (2019.01)
  *G05D 1/02* (2020.01)

(52) U.S. Cl.
  CPC .......... *B60L 53/37* (2019.02); *G05D 1/0212* (2013.01); *G05D 1/0276* (2013.01)

(58) Field of Classification Search
  CPC ..... B60L 53/37; G05D 1/0212; G05D 1/0276
  See application file for complete search history.

(56) References Cited

U.S. PATENT DOCUMENTS

| 9,776,520 B2 | 10/2017 | Shah |
| 10,099,566 B2 | 10/2018 | Wu et al. |
| 10,139,238 B2 * | 11/2018 | Widmer ............. G01C 21/3635 |
| 10,179,721 B2 | 1/2019 | Teruzzi |
| 10,209,981 B2 | 2/2019 | Hirshberg et al. |
| 10,279,696 B2 | 5/2019 | Dow et al. |
| 10,336,194 B2 | 7/2019 | Ricci |
| 10,427,304 B2 | 10/2019 | Leary |
| 10,443,262 B2 | 10/2019 | Evans |
| 10,604,027 B2 | 3/2020 | Dow et al. |
| 10,699,326 B2 | 6/2020 | Ricci |
| 10,926,659 B2 | 2/2021 | Lee et al. |
| 11,044,889 B1 | 6/2021 | Rogers |
| 2017/0225581 A1 * | 8/2017 | Chai ....................... B60L 53/30 |

* cited by examiner

*Primary Examiner* — Rodney A Butler
(74) *Attorney, Agent, or Firm* — Patent Law Works LLP

(57) ABSTRACT

A system and method are disclosed for strategically positioning and aligning an object, for example, a vehicle at a charging station, parking station, port, depot or dock for orientation, alignment and pairing. The system includes an active-alignment module that measures the three-dimensional orientation of the object within the particular working envelope of the charging station and provides it to a supervisory-control module, which synchronizes the three-dimensional planar data, for example, plane 1 or plane 3 with planar data of the object, for example, plane 2 or plane 4, a robot-assisted-alignment module, and a vehicle-control module. The supervisory-control module acquires and synchronizes the 3D planar data of the active-alignment module (plane 1 or 3) to the planar data of vehicle or object (plane 2 or 4).

20 Claims, 8 Drawing Sheets

SYSTEM AND METHOD FOR OBJECT ALIGNMENT AND PAIRING

BACKGROUND

1. Field of the Invention

The present invention relates to systems and methods for charging electrical objects such as electrical vehicles. More particularly, the present invention relates to an intelligent system and method for strategically positioning and orienting an object or a vehicle at a charging station, parking station, port, depot or dock for orientation, alignment, and pairing. The system includes a novel interface with an active-alignment module that measures the three-dimensional orientation of the object within a working range of automated actions within the charging station regardless of adverse weather conditions.

2. Description of the Related Art

Global growth of electrical objects, for example, electric vehicles, is on the rise. Electric vehicles are projected to replace vehicles powered by internal combustion engines over the next few decades. Typically, an electric vehicle requires frequent charging at charging stations to provide power for operation. During charging, energy storage systems, for example batteries, in the electric vehicle, receive and store power, which is consumed as the electric vehicle operates. This stored power in the energy storage system of the electric vehicle enables it e to operate until the charge is depleted and further charging is required. In some applications, (e.g., electric transit buses) charging stations may be provided along a route, and an electric vehicle may dock with and charge its batteries periodically during its normal operation.

Typically, the driver or operator of the electric vehicle, for example, a bus, truck, or car, must visually align it with the charging station (e.g., by using a line painted on the ground) so that the electric vehicle is suitably positioned to engage with the charging station. During charging, electrodes on the electric vehicle electrically connect with electrodes of the charging station to transfer power to the batteries of the electric vehicle. In some operating conditions however, particularly, in harsh or adverse weather conditions, dust particles (debris), snow, and ice, on the ground or in the air make visual alignment difficult. For example, debris, snow or ice can detrimentally affect the ability of the driver to visually see and align the electric vehicle to the charging station and thus hinder charging.

There is a continuing and dire need in the industry for improved charging interface mechanisms designed to automatically facilitate easy alignment and pairing of electric objects or vehicles regardless of any adverse or inclement weather conditions.

SUMMARY

The present technology overcomes the deficiencies and limitations of prior systems and methods, at least in part by, providing systems and methods for using three-dimensional positioning and orienting mechanisms to properly align an object, for example, an electric vehicle at a charging station, port, dock, or the like. For example, the systems and methods of the current disclosure may be used to align a vehicle within a "working envelope" of the present alignment-and-pairing system. It should be recognized by those skilled in the art that a "working envelope" refers to a range of movement within the charging environment. The charging interface is configured to perform only within the confines of this "working envelope."

In accordance with some embodiments of the present disclosure the systems and methods described here align any electric vehicle (e.g., car, bus, truck, etc.) at a charging station. The systems and methods of the present invention may be used to assist in aligning any type of vehicle (trains, cars, planes, etc.) for any purpose using the present configuration. Each of the embodiments disclosed herein may include one or more of the features described in connection with any of the other disclosed embodiments. In one embodiment, the method covers driving the electric vehicle towards the charging station to enter the "working envelope."

In some embodiments, the system and methods in accordance with the present invention serve as an alignment-and-pairing system ("APS"), which is an intelligent three-dimensional orientation interface that uses sensor technologies to properly position the electric vehicle in a defined space. For example, the sensor technologies utilized by the present system include radar sensors strategically positioned near the charging interface.

In some embodiments, the alignment-and-pairing system ("APS") comprises an active-alignment module ("AAM"), a supervisory-control module ("SCM"), a robot-assisted-alignment module, and a vehicle-control module (or an object-control module). The alignment-and-pairing system are strategically positioned within the working envelop of a charging station, parking station, port, depot or dock where object orientation, alignment and/or pairing is required. The active-alignment module is configured to serve as a precision platform that acts as a three-dimensional planar datum to objects in the world or space. The active-alignment module utilizes sensors such as radar sensors to detect and to measure the three-dimensional planarity or orientation of an object or a vehicle that is moving or stationary within the specified working envelop or active range.

In some embodiments, the supervisory-control module ("SCM") is configured to acquire and synchronize the three-dimensional planar data received from the active-alignment module (Plane 1 or 3) to the planar data of the vehicle or object (Plane 2 or 4). The alignment-and-pairing system ("APS") may apply to any number of planes. It should be recognized by those skilled in the art that planar acquisition may be any number of planes and not limited to four as illustrated here.

In some embodiments of the present invention, the supervisory-control module ("SCM") is configured to perform specialized functions or operations with the objects or vehicles with which it is paired electrically and/or mechanically. The supervisory-control module ("SCM") performs key functions, including, but not limited to, the functions detailed here. In some embodiments, the supervisory-control module ("SCM") calculates approximate positioning, for example, a maximum specified positional offset of a vehicle relative to the location or position of the active-alignment module components within the "working envelope" and feeds this offset to the vehicle-control module to make real-time adjustments, either though electronic or visual commands. Once the vehicle or object is within its specified position, the supervisory-control module ("SCM") issues a "park," "rest," or other such command. Alternatively, the supervisory-control module ("SCM") suggests a driving pattern or navigational instructions for the driver or operator to follow to align the electric vehicle at the charging station.

The navigational instructions to the driver of the vehicle may be based on the positional offsets determined.

In some embodiments, the supervisory-control module ("SCM") calculates and sends the final or absolute offsets of the stationary object or vehicle to a robot or robotic interface. The robot is configured to align its planar datums to the planar datums of the object or vehicle. In some instances, the co-planar geometries and tolerances are configured to be adjustable based on specific requirements and circumstances specified by operators or others. Once the three-dimensional ("3D") coplanar positions are realized, the robot or robotic interface in communication with supervisory-control modules ("SCM") sends a command indicative of "cycle complete." This command signals a prompt to the supervisory-control module ("SCM") to initiate the next sequence, which may be to initiate pairing or that the dock sequence is complete.

In yet other embodiments, the supervisory-control module ("SCM") continuously poles the active-alignment module ("AAM"), which monitors in "real time" that the coplanarity actively sends positional data to the supervisory-controller robot for on-the-fly adjustment.

In yet other embodiments, the system in accordance with the present invention integrates and monitors the vehicle or object functions such as communications, inputs and outputs and other pertinent systems that are dependent on the relationship.

The system and methods disclosed are advantageous in a number of respects. The system and methods provide measurement of multiple three-dimensional planes, which can reference relative position and track lateral and elevational changes between two or more targets dynamically and continuously. The alignment-and-pairing system ("APS") uses sensor technology, by which its use is immune to weather conditions. This system may be safely used anywhere. In addition, the present invention and its automated technology is well suited to handle high power charging while providing safety to humans and safeguarding equipment.

BRIEF DESCRIPTION OF THE DRAWINGS

The present invention is illustrated by way of example, and not by way of limitation in the figures of the accompanying drawings in which like reference numerals are used to refer to the same or similar elements.

DETAILED DESCRIPTION

The system and methods of this technology are configured for aligning and pairing an object such as an electronic vehicle for coupling it to a charging interface for charging. The aligning-and-pairing system ("APS") and methods in accordance with the present invention provide measurement of multiple three-dimensional planes, which reference relative position and track lateral and elevational changes between two or more targets dynamically and continuously. The system uses radar sensor technology, by which it is immune to inclement weather conditions, debris on the ground or any factor that impairs visual perception required to position the object or vehicle in a desired location.

In the following description, for purposes of explanation, numerous specific details are set forth in order to provide a thorough understanding of this technology. It will be apparent, however, that this technology can be practiced without some of these specific details. In other instances, structures and devices are shown in block diagram form in order to avoid obscuring the innovative aspects. For example, the present technology is described in some implementations below with reference to particular hardware and software.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

Figure 1:
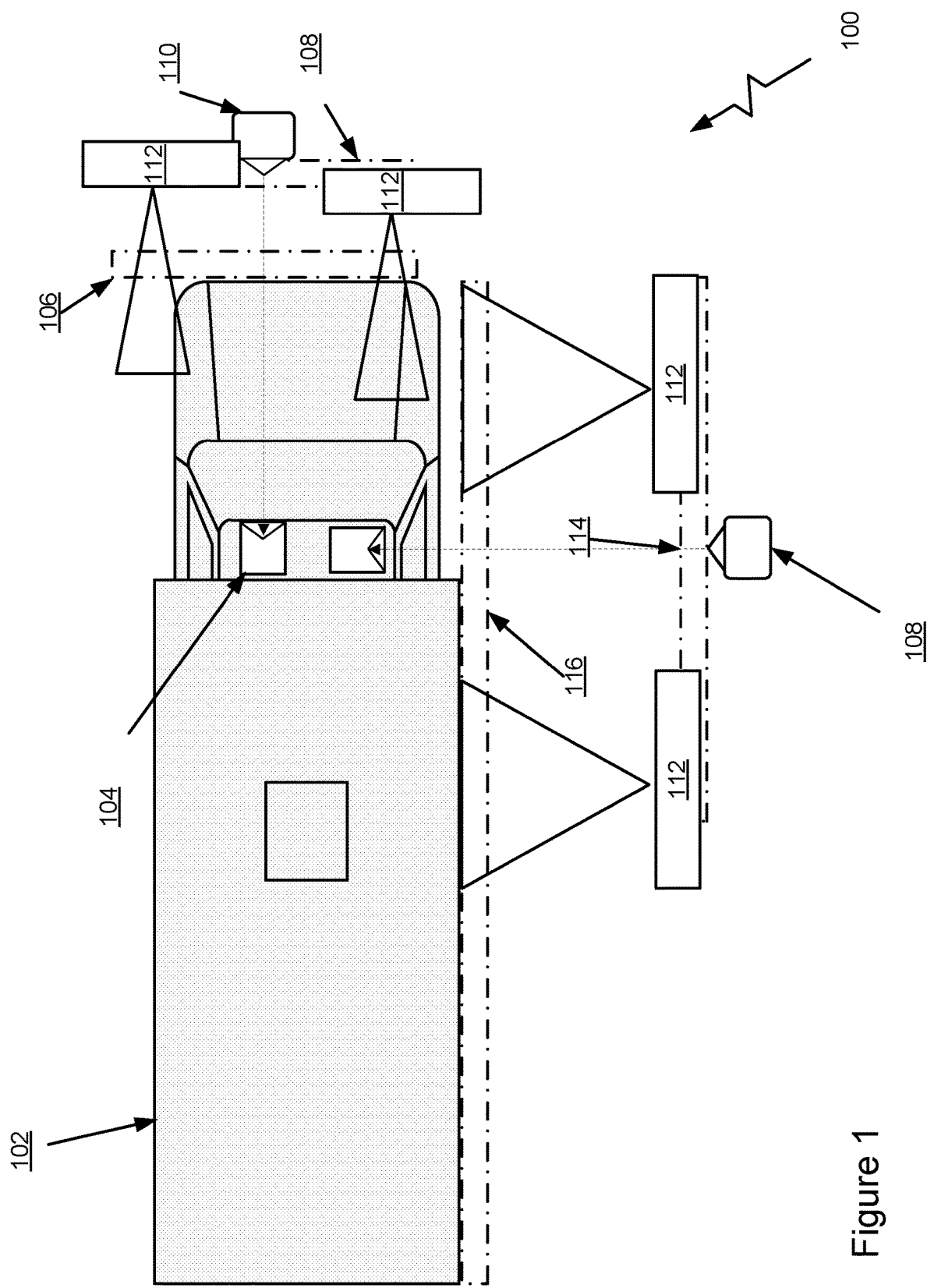
FIG. 1 is a high-level block diagram, illustrating an example alignment-and-pairing system ("APS") in accordance with the present invention.

Referring now to FIG. 1, the alignment-and-pairing ("APS") system 100 in accordance with the present invention is illustrated in an example EV-charging station infrastructure. The alignment-and-pairing system 100 is strategically positioned within the working envelop of a charging station, parking station, port, depot or dock where object orientation, alignment and/or pairing is required. FIG. 1 illustrates by way of example, a medium delivery truck 102 positioned for receiving power at the EV-charging station. For example, the truck drives into the working envelope such that its side surface is aligned substantially parallel to a plane (e.g., 3D plane 2 in FIG. 1). Alternatively, any other vehicle or object may be positioned in the charging area illustrated. The vehicle typically has a charging receptacle 104 as illustrated in the medium delivery truck 102. The charging receptacle is typically positioned on the roof of the vehicle and a charge is received by lowering the charging interface on the roof.

As is known to those skilled in the art, for charging electric vehicles ("EV"), the EV-charging station comprises components including an electric-vehicle charger (e.g., see charging plug 110 illustrated in FIG. 1), a power grid, a facility meter, an energy controller, a software platform, a network-operating center, and other relevant components. The power storage system at EV-charging stations typically includes three main units, typically, a battery, a power-conversion system, and software. The batteries may be lithium-ion batteries, typically consisting of cells, packs, battery-management systems ("BMS") to manage control of the charge and discharge of the battery. The EV-charging station also typically has a power-conversion system, which comprises an inverter, its enclosure, and thermal management (HVAC) for batteries to maintain the battery at a specific temperature. The EV-charging station also has electric-vehicle charging software as an integral part of EV-charging infrastructure. The software may have charge point operators and e-mobility service providers to manage EV-charging stations and their customers or users. EV-charging software, web-based or mobile-based, assists in managing the EV chargers at charging stations. Some key features of the EV-charging software include functions to connect and monitor the charger, automatic fault detection, live meter display, billing and payments, tracking of costs, managing users, interactive dashboard and more. Newer charging stations use improved technologies in which electric vehicle batteries may be charged for a driving range of hundred kilometers in just three to five minutes. Such systems of e-mobility make electric vehicle charging at EV charging stations suitable for everyday use and more. For example, charging electric vehicles with 500 amps at a fast-charging station with high power charging technology is becoming common.

FIG. 1 illustrates alignment of three-dimensional ("3D") planes by the alignment-and-pairing ("APS") system 100. The measurement of multiple three-dimensional planes may reference relative position and track lateral and elevational changes between two or more targets dynamically. Sensor technology is used to make this tracking immune to weather conditions. As illustrated, sensors 112 are located at strategic positions to provide measurements of multiple three-dimensional planes. Example three-dimensional planes include a "3D Plane 1," a "3D Plane 2," a "3D Plane 3," and a "3D Plane 4." The "3D Plane 1" is indicated in the drawings by reference numeral 114. The "3D Plane 2" is indicated in the drawings by reference numeral 116. The "3D Plane 3" is indicated in the drawings by reference numeral 106. The "3D Plane 4" is indicated in the drawings by reference numeral 108. The alignment-and-pairing ("APS") system 100 is configured to assist any vehicle or object such as the truck 102 to properly position and orient itself to receive charge at the EV-charging station, via the charging pins.

Figure 2A:
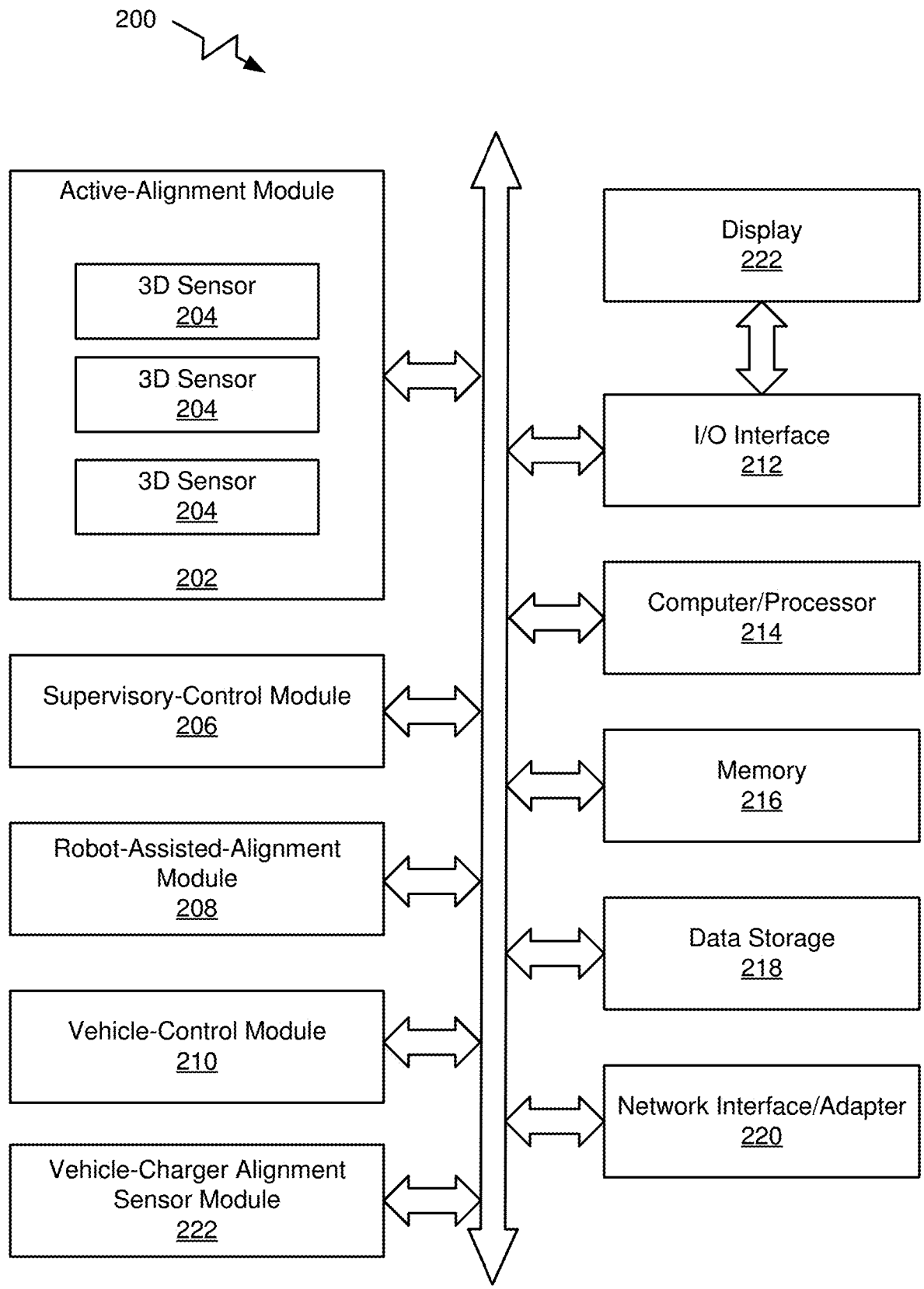
FIG. 2A is a block diagram illustrating example components of the alignment-and-pairing system in accordance with the present invention.

Referring now to FIG. 2A, the alignment-and-pairing system 100 includes various modules and components illustrated collectively and referenced by reference numeral 200. The alignment-and-pairing system 100 comprises an active-alignment module ("AAM") 202, a supervisory-control module ("SCM") 206, a robot-assisted-alignment module 208, and a vehicle-control module 210.

The active-alignment module 202 is a precision platform with software or a program with computer instructions stored in an executable file to execute functions by a computer that provide three-dimensional planar datum to objects in the world or space. As should be recognized by those skilled in the art, datum reference frames geometric dimensioning) are typically 3D. Datum reference frames are used as part of the feature control frame to show where the measurements are taken from and may be used to determine the geometry of any object. For example, a typical datum reference frame is made up of three planes. The three planes may be one "face side" and two "datum edges." These three planes in the datum reference frame may be marked as desired, for example, A, B and C. where A is the face side, B is the first datum edge, and C is the second datum edge. In this example, the datum reference frame is A/B/C, which may be shown at the end of feature control frame to show from where the measurement is taken. Any important part of an object may be used, for example, a point, line, plane, hole, set of holes, or pair of s, to serve as a reference in defining the geometry of the object.

The executable file may be linked to static or dynamic-linked libraries. The active-alignment module 202 utilizes 3D sensors 204 such as radar sensors to detect and measure the three-dimensional planarity (orientation) of an object or vehicle that is moving or is stationary within the specified working envelop. It should be recognized by those skilled in the art that a robot's "working envelope" is its range of movement or the space within which it can reach. It is the shape created when a manipulator reaches forward, backward, up and down. These distances are determined by the length of a robot's arm and the design of its axes. Each axis contributes its own range of motion. The radar sensors serve as conversion devices that transform microwave echo signals into electrical signals. They use wireless sensing technology to detect motion by figuring out the vehicle's position, shape, motion characteristics, and motion trajectory.

The supervisory-control module ("SCM") 206 acquires the 3D planar data (in Planes 1 or 3) from the active-alignment module 202 and synchronizes the acquired 3D planar data with the planar data of the vehicle or object (in Planes 2 or 4). Planar acquisition may be, by using any number of planes and not limited to four, as illustrated here. It should be recognized by those skilled in the art, that four planes are used here simply for illustration purposes. More planes may be used to gather more data if desired and for different circumstances. The supervisory-control module ("SCM") 206 performs specialized functions with the objects or vehicle with which it is paired either electrically or mechanically. For electrical charging, an electric vehicle with a chargeable/dischargeable power storage is charged by an external power supply, by securing a control device that controls the external power supply.

The robot-assisted-alignment module 208 in some embodiments includes a robot configured to verify object placement, which aligns the local charging interface to the vehicle receptacle interface. The alignment-and-pairing system 100 further includes a vehicle-control module 210, which is configured to make any real-time adjustments or corrections based on evaluating the positional offset data.

The various modules and components illustrated collectively and referenced by reference numeral 200 in addition include other hardware components that perform the functions described. The alignment-and-pairing system 100 includes a computer/process 214 coupled by a bus to an input/output (I/O) interface 212, which is coupled to a memory 216, a data storage 218, and a network interface/adapter 220.

The present technology also relates to an apparatus for performing the operations described. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Components of the present technology can take the form of an entirely hardware embodiment, an entirely software embodiment or an implementation containing both hardware and software elements. In some implementations, this technology is implemented in software, which includes but is not limited to, firmware, resident software, microcode, etc. Furthermore, this technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer or data processing system 214 is suitable for storing and/or executing program or executable code includes at least one processor coupled directly or indirectly to memory elements through the system bus. The memory elements can include local memory 216 employed during actual execution of the program code, bulk storage, and cache memories, which provide temporary storage of at least some program code in order to reduce the number of times, code must be retrieved from bulk storage (data storage 218) during execution. Input/output or I/O devices (including but not limited to, keyboards, displays, pointing devices, etc.) can be coupled to the system either directly or through intervening I/O controllers.

Network interface or adapter 220 or such network interface units are illustrated coupled to the system to enable the data processing system 214 to become coupled to other data processing systems or remote printers or storage devices through intervening private or public networks. A network interface may be a network interface controller, a network interface card, a network adapter or any such hardware component that is designed to allow computers to access an interconnection network for communication and synchronization purposes. The network interface is configured to provide two different kinds of interfaces, one toward the computer (host) side and one toward the network side. The network interface translates the protocol of the host interface to the network protocol and vice versa, and translates between the different physical media. In a network, network interfaces are the end points of the network. At these end points, the network packets are injected into, respectively, or retrieved from the network. As all end points of a network must be uniquely addressable, each network interface is assigned a unique number. Modems, cable modem, and ethernet cards are just a few of the currently available types of network adapters. For example, the network adaptor may be a network interface module coupled to a network by a signal line and a bus as illustrated. The network interface module may include ports for wired connectivity such as but not limited to USB, SD, or CAT-5, etc. The network interface module may link the processor 214 to a network that may in turn be coupled to other processing systems. The network may comprise a local area network (LAN), a wide area network (WAN) (e.g., the Internet), and/or any other interconnected data path across which multiple devices may communicate. The network interface module may provide other conventional connections to the network using standard network protocols such as TCP/IP, HTTP, HTTPS and SMTP as will be understood to those skilled in the art. In other embodiments, the network interface module may include a transceiver for sending and receiving signals using WIFI, Bluetooth® or cellular communications for wireless communication.

Finally, the algorithms and displays presented here are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

Each computer 214 in the system may include one or more input and output (I/O) unit 212, a memory system 216, and one or more processing units. The "I/O" units of each computer 214 may be connected to various input/output devices 212, such as a mouse, keyboard, video card (video monitor), sound card (with speakers), network card, and printer. The memory system 216 in a typical general purpose computer system usually includes a computer readable and writeable nonvolatile recording medium, of which a magnetic disk, a flash memory and tape are examples. The memory system 218 operably holds the operating system, utilities, and application programs. It should also be understood the invention is not limited to the particular input devices, output devices, or memory systems used in combination with the computer system or to those described herein. Nor should the invention be limited to any particular computer platform, processor, or high-level programming language.

The computer/processor 214 processes data signals and program instructions received from the memory 216. For example, the processor 214 may comprise an arithmetic logic unit, a microprocessor, a general-purpose controller or some other processor array programmed in accordance with the present invention to perform computations and provide electronic display signals to the display 222. The processor 214 is coupled to the bus for communication with the other components. Processor 214 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. It will be obvious to one skilled in the art that other processors, operating systems, sensors, displays and physical configurations are possible.

The memory 216 is non-transitory storage medium. The memory 216 stores the instructions and/or data which may be executed by the computer/processor 214. In some embodiments, the instructions and/or data stored on the memory 204 comprises code for performing any and/or all of the techniques described herein. The memory 204 may be a dynamic random-access memory (DRAM) device, a static random-access memory (SRAM) device, flash memory or some other memory device known in the art. The memory 216 may store a web browser with the JavaScript for conducting any functions that require access to remote networks or libraries. In some embodiments, the cache memory 216 is coupled to the processor 214. The cache memory 216 is a random-access memory (RAM) that the processor 214 may access more quickly than it can access regular RAM. This cache memory 216 is typically integrated directly with the processor chip or may be on a separate chip that has a separate bus interconnect with the processor 214. The cache memory 216 is used to reduce the average time to access data from the main memory or data storage 218. The cache is a smaller and faster memory, which stores the program instructions that are frequently referenced by the software during operation. Fast access to these instructions increases the overall speed of the software program. In operation, as the processor 214 processes data, it looks first in the cache memory 216 for instructions and if it finds the instructions there (from a previous reading of the data), it does not conduct a more time-consuming reading of data from the larger memory or other data storage devices 218. In some instances, multi-tier or multilevel caching, with different levels providing greater efficiency may also be used.

The network interface or adapter 220 facilitates the communication between the software servers via a network for remote processing or linking with other remote systems.

The display device 222 serves to display any information or control functions desired at the charging station. For example, the display 222 may be used to display a graphical illustration of a relative orientation of the truck with respect to the three-dimensional planes.

Figure 2B:
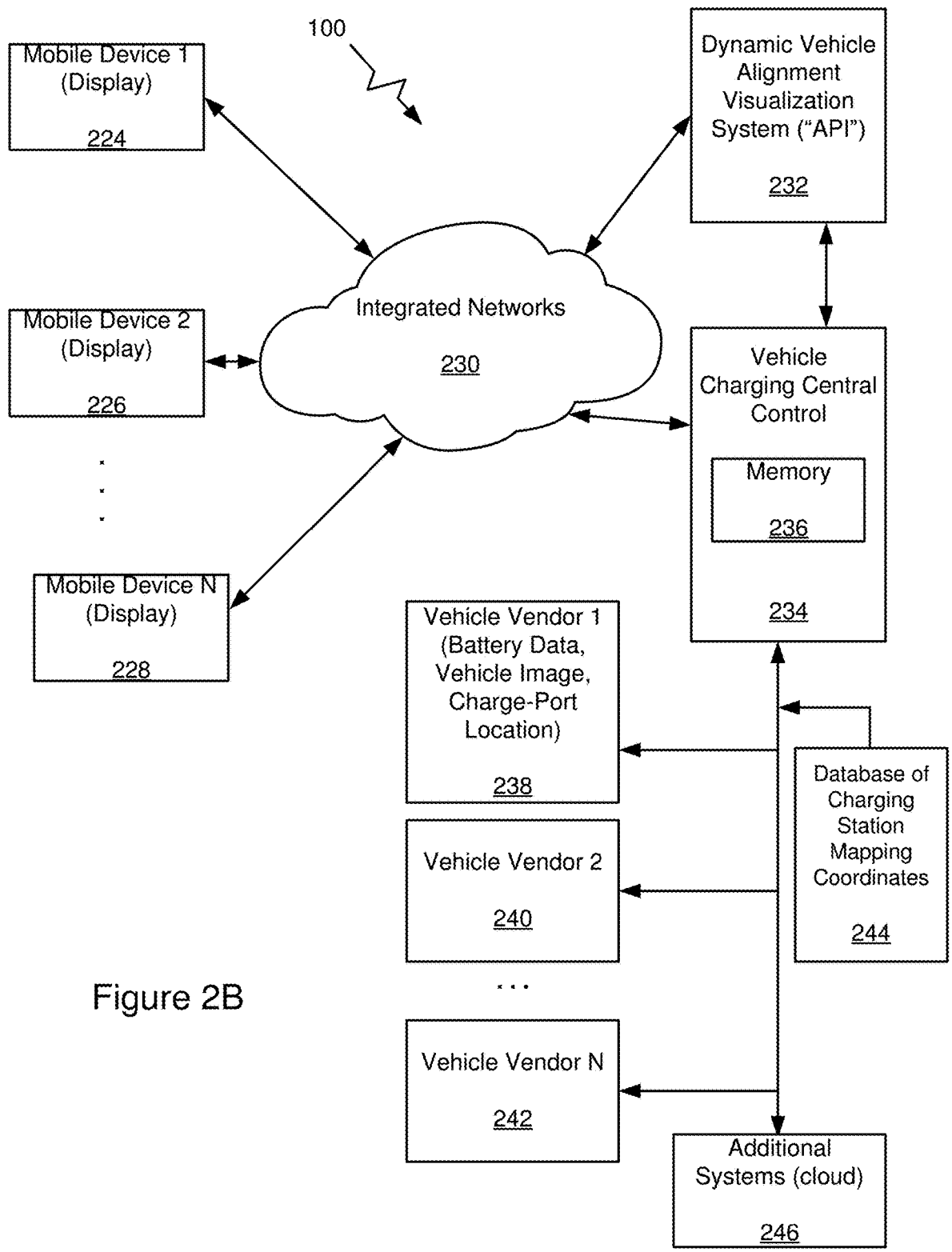
FIG. 2B is a block diagram illustrating the way by which a dynamic alignment/sensor program is provided via an application-programming interface to users.

Referring now to FIG. 2B, the illustrated system 100 may be implemented in a distributed architecture, for example, in a cloud architecture, including mobile devices ("Mobile Device 1," "Mobile Device 2," and "Mobile Device N"), each with display, designated by reference numerals 224, 226, and 228, respectively. Each mobile device is connected via integrated networks 230 (one or more networks connected for direct interaction and cloud connectivity) to the dynamic vehicle alignment visualization system ("API") 232. In some embodiments, the dynamic vehicle alignment visualization system ("API") 232 is configured to provide a visual image and mapping of a charging station including its working envelope. As illustrated, the dynamic vehicle alignment visualization system ("API") 232 is coupled to a vehicle charging-central control 234 with memory 236, which serves to transmit and control information flow to the dynamic-vehicle alignment visualization system ("API") 232. The vehicle charging central control 234 is coupled to a database (one or more, in a single location, distributed, or in the cloud) with a charging-station mapping coordinates engine designated by reference numeral 244 that stores data representing a network of charging station locations, by defined area (e.g., city, county, or the like); mapping coordinates of each charging station, which may be provided to display on each of the mobile devices. Users bringing their vehicles for charging may easily align their respective vehicles guided by the dynamic vehicle alignment visualization system ("API") 232 relative to the mapping coordinates of each charging station received on the user's device display. For example, the medium delivery truck 102 would receive an image and mapping coordinates for a charging station before driving in (either by sending a query before or upon sensing at the charging station that it is ready for positioning). The medium deliver truck 102 would position for receiving power at the EV-charging station, by driving into the working envelope such that its side surface is aligned substantially parallel to a plane (e.g., 3D plane 2 in FIG. 1). Alternatively, any other vehicle or object may be positioned in the charging area illustrated. The vehicle typically has a charging receptacle 104 (FIG. 1) as illustrated in the medium delivery truck 102. The charging receptacle may be positioned anywhere in the vehicle and a charge is received by guiding the charging interface to the charging receptacle. The vehicle-charging central control 234 further receives, directs, and controls flow of data provided by vehicle vendors or manufacturers (e.g., vehicle vendor 1 designated by reference numeral 238, vehicle vendor 2 designated by reference numeral 240, through vehicle vendor N designated by reference numeral 242). The data may represent vehicle specifications including battery data, vehicle image, or a charge-port location to ease the charging process in the instant that the vehicle user desires. The vehicle charging central control 234 as illustrated is further coupled to additional systems generally designated by reference numeral 246.

Some portions of the detailed descriptions that follow are presented in terms of algorithms and symbolic representations of operations on data bits within a computer memory, such as those illustrated in FIG. 2A. These algorithmic descriptions and representations are the means used by those knowledgeable in the data processing arts to most effectively convey the substance of their work to others in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device (such as or including the computer/processor 214), that manipulates and transforms data represented as physical (electronic) quantities within the computer system's registers and memories (such as or including the memory 216 and data storage 218) into other data similarly represented as physical quantities within the computer system memories or registers or other such information storage, transmission or display devices.

Figure 3:
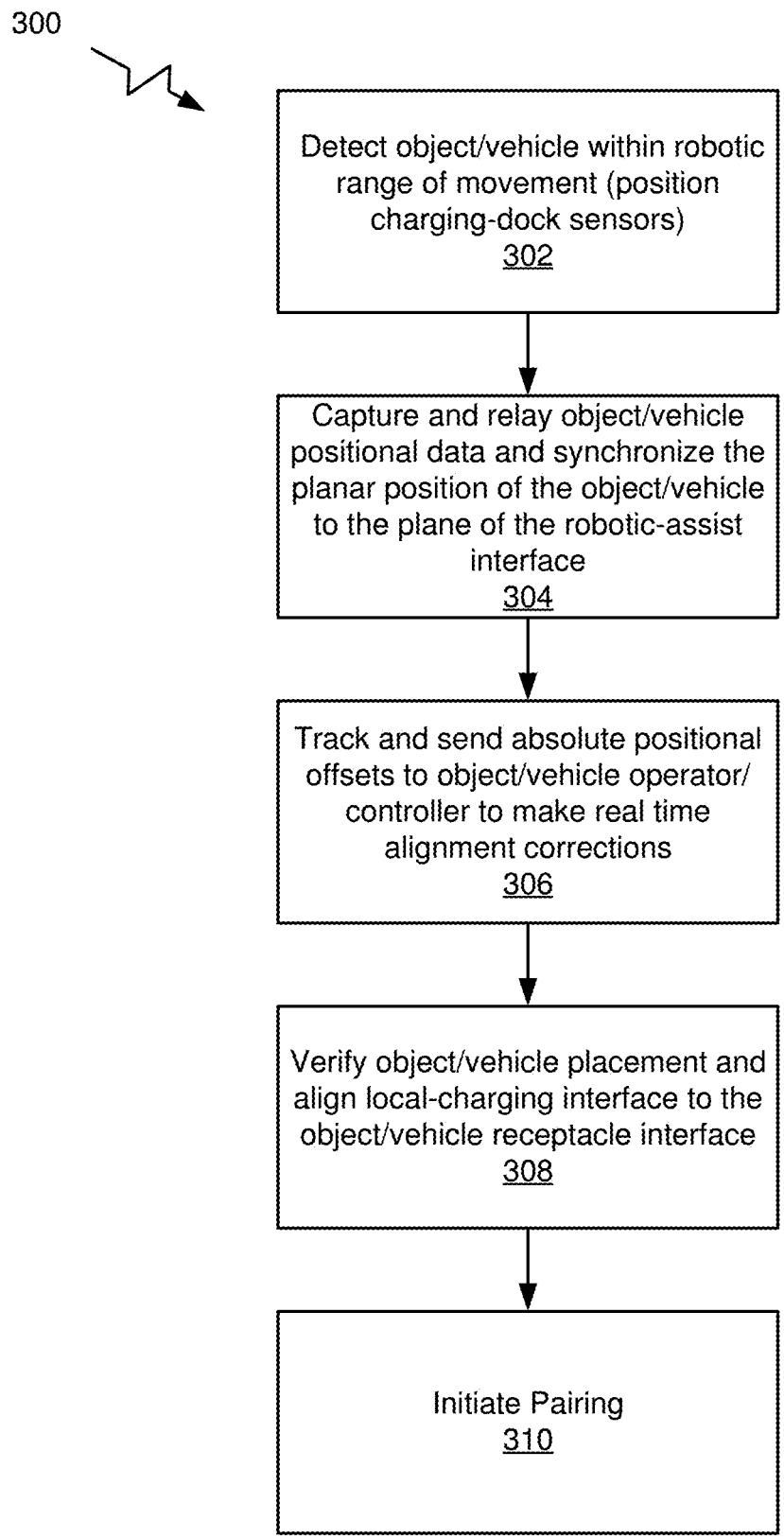
FIG. 3 is a flow chart illustrating one embodiment of the method of alignment and pairing in accordance with the present invention.

In some embodiments, in operation, the supervisory-control module 206 performs the functions described below with the other components described. In other embodiments, additional functions may be included. Referring now to FIG. 3, the operation flow is shown generally by reference numeral 300. The operation flow begins at block 302, representing one or more operations for detecting an object or the vehicle within the robotic range of movement. The charging-dock sensors are positioned at strategic locations to detect the vehicle 102. For example, the supervisory-control module 206 calculates approximate positioning (maximum specified positional offset of the vehicle to the three-dimensional planes used by the active-alignment module 202 within the working envelope).

The operation flow 300 proceeds to the next block 304, representing one or more operations configured to capture and relay object or vehicle positional data and synchronize the planar position of the object or vehicle to the plane of the robotic-assist interface. For example, in some embodiments, the supervisory-control module 206 calculates and sends the final offsets of the stationary object or vehicle to a robot via the robot-assisted-alignment model 208. The robot aligns its planar datums to the planar datums of the object or vehicle 102. It should be recognized by those skilled in the art that a planar datum is the true geometric counterpart of a planar datum features. A true geometric counterpart is the theoretical perfect boundary or best fit tangent plane of a specified datum feature. Datum planes are features used to provide references for other features, like sketching planes, dimensioning references, view references, assembly references, and so on. Datum planes are not physical parts of the model here, but are used to aid in model creation by the active-alignment module. A datum feature in this application is a perfect plane or surface, as defined by the three-dimensional planes illustrated in FIG. 1.

The operation flow 300 proceeds to the next block 306, representing one or more operations configured to track and send absolute positional offsets to the object or vehicle operator or controller to make alignment adjustments in real time. For example, the supervisory-control module 206 provides the final offsets of the stationary object or vehicle relative to the robot to the vehicle-control module 210 to make adjustments in real time. Communications to operators of the vehicle 102 by the vehicle-control module 210 are through electronic or visual commands. Once the vehicle is within its specified position, the supervisory-control module issues a "park" command.

The operation flow 300 proceeds to the next block 308, representing one or more operations configured to verify the object/vehicle placement and align local-charging interface to the object or vehicle receptacle interface. For example, co-planar geometries and tolerances are adjustable as determined or required. The supervisory-control module 206 continuously poles the active-alignment module 202, which monitors in real time, the coplanarity to actively send positional data to the supervisory controller robot for "on the fly" adjustments. Once the supervisory-control module 206 realizes three-dimensional coplanar positions, the robot sends a "cycle complete" command, thereby prompting the supervisory-control module 206 to initiate the next sequence. The supervisory-control module 206 monitors and integrates any and all vehicle or object functions such as communications, inputs and outputs and other pertinent systems that are dependent on the relationship.

The operation flow 300 concludes with the next block 310, representing one or more operations configured to initiate pairing. For example, the supervisory-control module 206 determines that the sequence of steps performed by the charging dock to position the object or vehicle is complete, at which point pairing is initiated.

Figure 4:
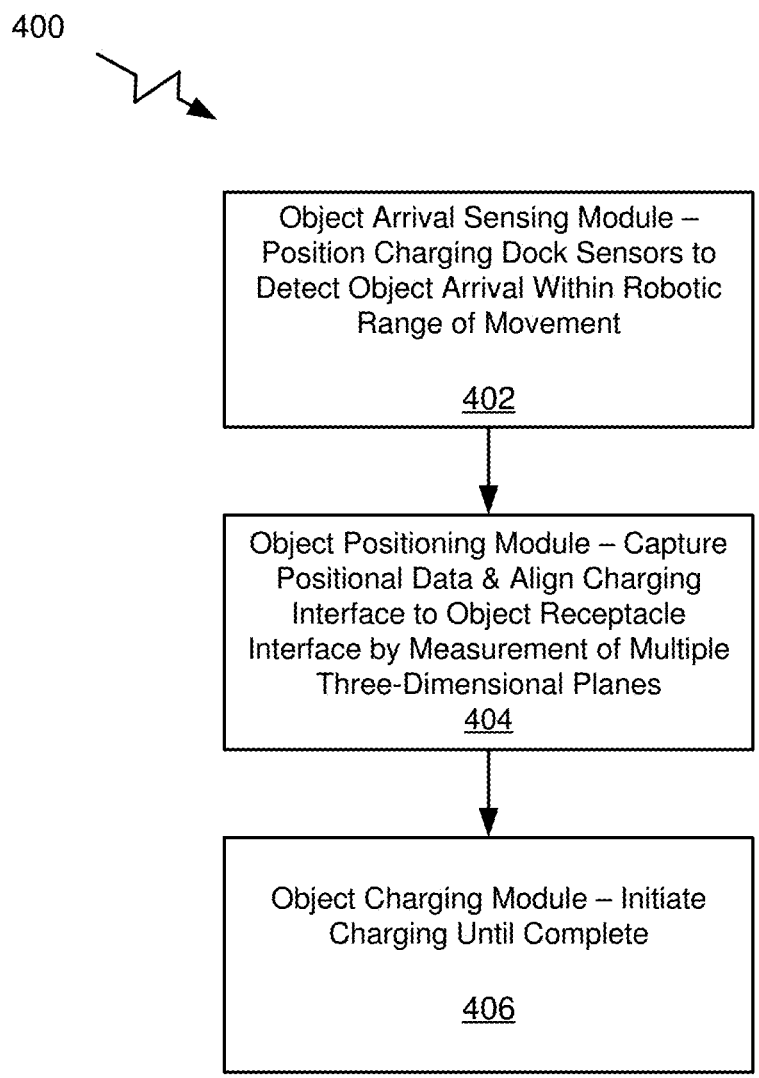
FIG. 4 is a flow chart illustrating one embodiment of the alignment and pairing method used for charging an electronic object such as a vehicle.

Referring to FIG. 4, a general operation flow of the module functionalities for use with any object is shown generally at 400. The process 400 begins at block 402, representing one or more operations performed by an object arrival sensing module (e.g., such as the active-alignment module 202) that detects the object's arrival within robotic range of movement. The process 400 continues to block 404 representing one or more operations performed by an object positioning module (e.g., such as the supervisory-control module 206 and robot-assisted-alignment module) that captures the object's positional data and aligns the charging interface to object receptacle interface by measurement of multiple three-dimensional planes. The process 400 concludes with block 406 representing one or more operations performed by an object charging module (e.g., vehicle control module) that initiates charging until complete.

Figure 5:
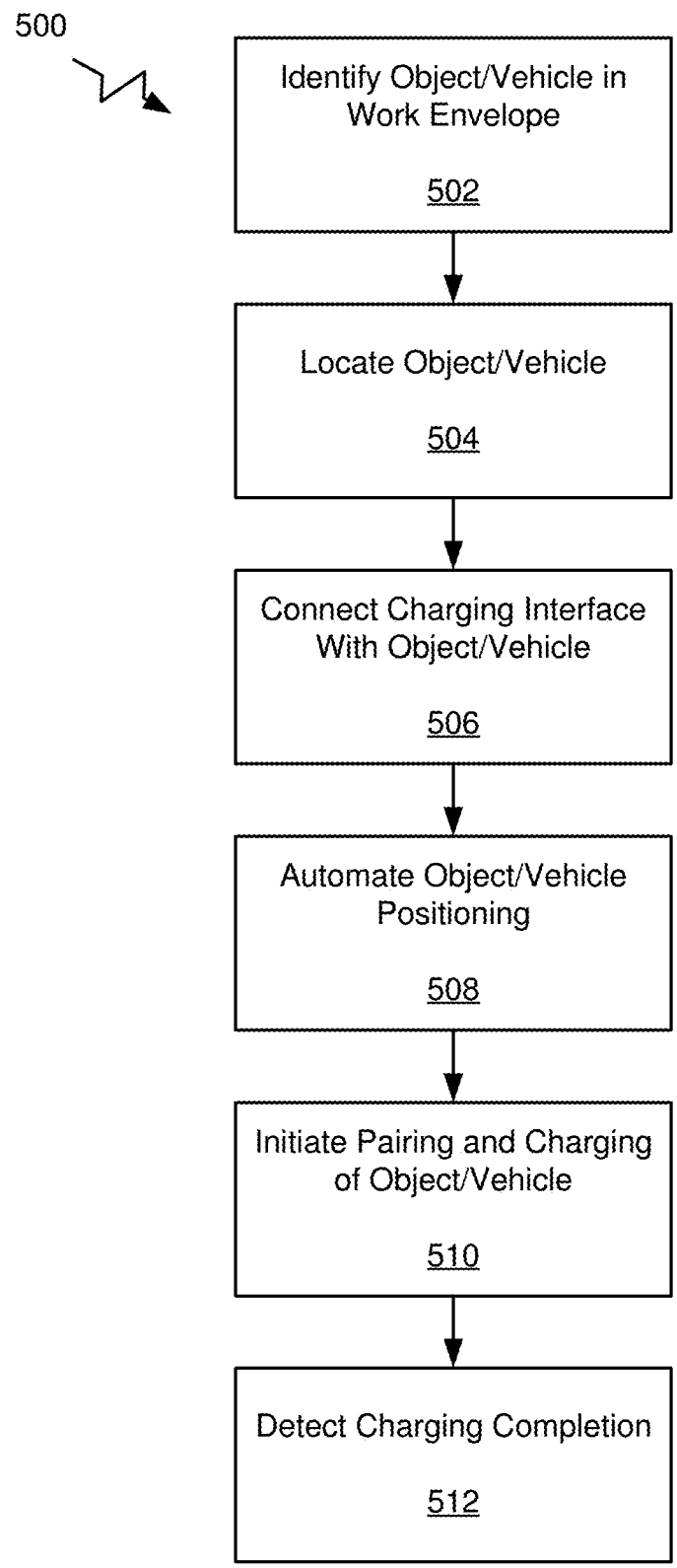
FIG. 5 is a flow chart illustrating a method that identifies a vehicle within a working envelope, positions it, connects the charging interface and initiates and completes charging of the electric vehicle.

Referring to FIG. 5, the operations flow that identifies a vehicle within a working envelope, positions it, connects the charging interface and initiates and completes charging of the electric vehicle is shown generally at 500. The process flow 500 begins at block 502, representing one or more operations for identifying the object or vehicle in the work envelope. The process flow 500 continues to block 504, representing one or more operations for locating an object or vehicle. The process flow 500 continues to block 506 representing one or more operations for connecting the charging interface with the object or vehicle. The process 500 continues to block 508 representing one or more operations for automating the object or vehicle's positioning. The process flow 500 continues to block 510 representing one or more operations for initiating pairing and charging of the object or vehicle. The process flow 500 concludes with block 512 representing one or more operations for detecting charging completion.

Figure 6:
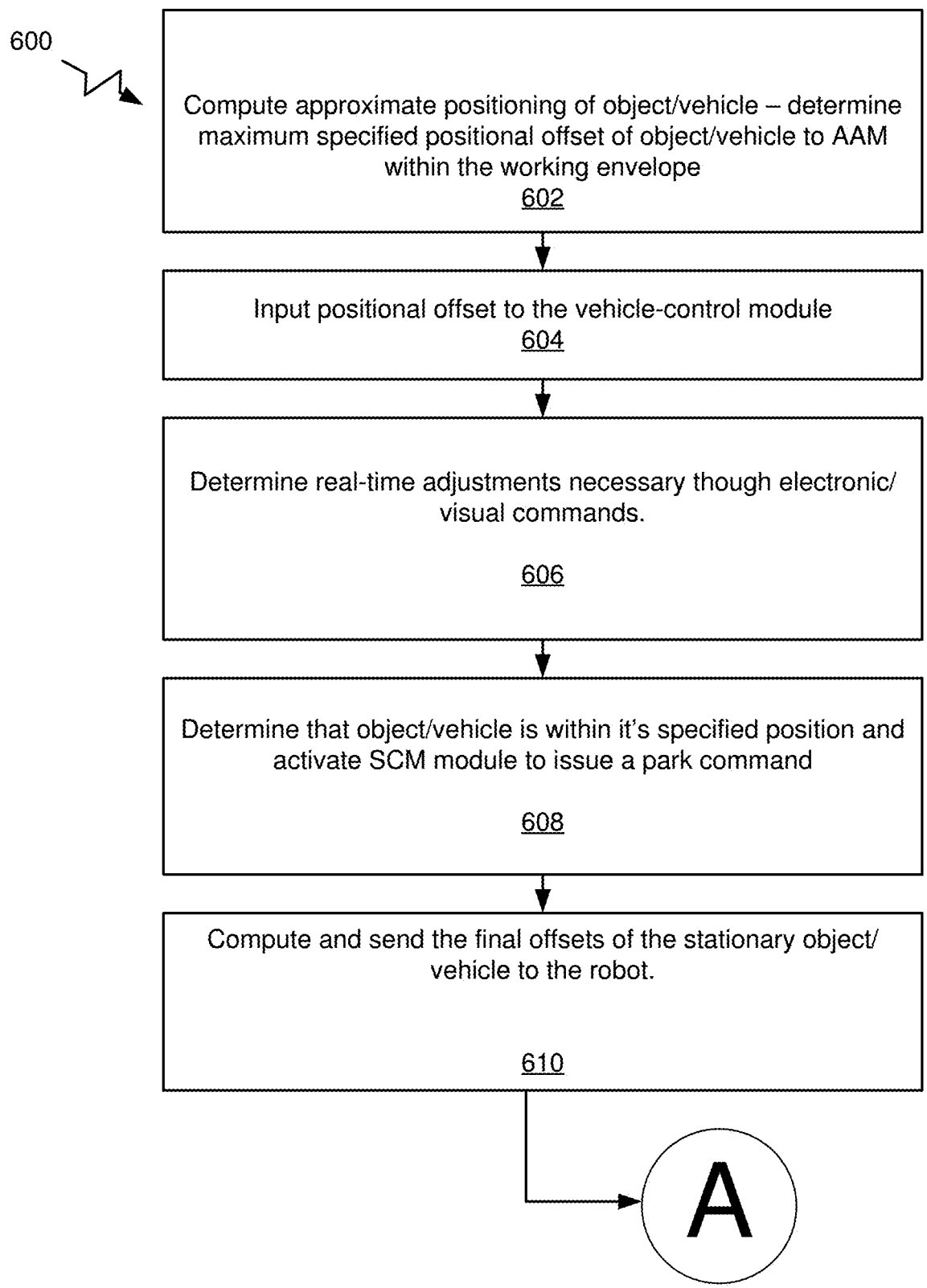
FIG. 6 is a flow chart illustrating the steps involved in positioning and adjusting the object/vehicle within the charging envelope before charging.

Referring now to FIG. 6, the operations flow and steps involved in positioning and adjusting the object/vehicle within the charging envelope before charging is shown generally at 600. The process flow 600 begins at block 602, representing one or more operations for computing the approximate positioning of the object or vehicle and determining the maximum specified positional offset of the object or vehicle to the active-alignment module 202 ("AAM") within the work envelope. The process flow 600 continues to block 604, representing one or more operations for inputting the positional offset to the vehicle-control module. The process flow 600 continues to block 606, representing one or more operations for determining real-time adjustments necessary through electronic or visual commands. The process flow 600 continues to block 608, representing one or more operations for determining that the object or vehicle is withing its specified position and activating the supervisory-control module 206 ("SCM") to issue a park command. The process flow 600 continues to block 610, representing one or more operations for computing and sending the final offsets of the stationary object or vehicle to the robot.

Figure 7:
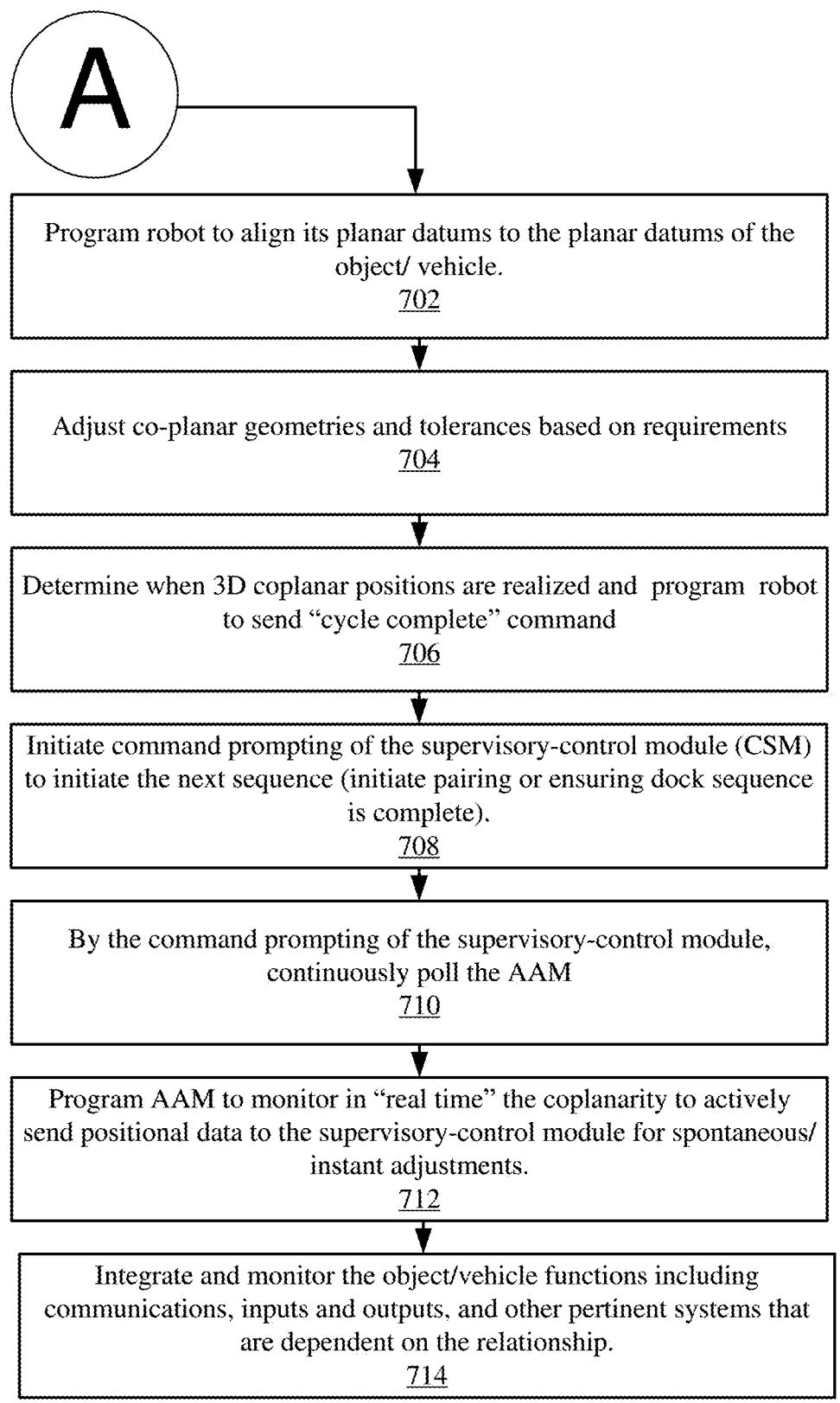
FIG. 7 is a flow chart illustrating the additional steps involved in positioning and aligning the object/vehicle within the charging envelope before charging.

FIG. 7 continues the operation flow shown generally at 600, as illustrated by flow connector "A" shown at the end of the flow chart in FIG. 6 and the beginning of the flow chart in FIG. 7. The process flow 600 continues at block 702, representing one or more operations for programming the robot to align its planar datums to the planar datums of the object or vehicle. The process flow 600 continues at block 704, representing one or more operations for adjusting co-planar geometries and tolerances based on requirements. The process 600 continues at block 706, representing one or more operations for determining when the three-dimensional co-planar positions are realized and programming the robot to send a "cycle complete" command. The process 600 continues at block 708, representing one or more operations for initiating a command to prompt the supervisory-control module 206 to initiate the next sequence, which initiates pairing or ensuring that the dock sequence is complete. The process 600 continues at block 710, representing one or more operations for continuously polling the active-alignment module 202 with the command that prompts the supervisory-control module 206. The process 600 continues at block 712, representing one or more operations for programming the active-alignment module 202 to monitor the coplanarity in real time, to actively send positional data to the supervisory-control module 206 for spontaneous and instant adjustments. The process 600 concludes with block 702, representing one or more operations for integrating and monitoring the object or vehicle's functions including communications, inputs and outputs, and other pertinent systems that are dependent on the relationship.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present inventive technology be limited not by this detailed description, but rather by the claims of this application. As will be understood by those familiar with the art, the present inventive technology may be embodied in other specific forms without departing from the spirit or essential characteristics thereof. Likewise, the particular naming and division of the modules, routines, features, attributes, methodologies and other aspects are not mandatory or significant, and the mechanisms that implement the present inventive technology or its features may have different names, divisions and/or formats. Furthermore, as will be apparent to one of ordinary skill in the relevant art, the modules, routines, features, attributes, methodologies and other aspects of the present inventive technology can be implemented as software, hardware, firmware or any combination of the three. Also, wherever a component, an example of which is a module, of the present inventive technology is implemented as software, the component can be implemented as a stand-alone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present inventive technology is intended to be illustrative, but not limiting, of the scope of the present invention, which is set forth in the following claims.

What is claimed is:

1. A method for automatically aligning and pairing an electric object with a power source at a charging station for receiving charge from the power source, comprising:
    positioning a plurality of sensors of locations near the power source at the charging station;
    capturing, by the plurality of sensors, approximate positioning of the electric object within a defined area specifying a range of movement for automated action via a robotic interface coupled to a robot, by dynamically measuring one or more changes along a plurality of three-dimensional planes in the defined area, the sensors detecting arrival of the electric object within the range of movement in an instance the electric object positions within the defined area;
    calculating, by a processor, a positional offset of said electric object to an active-alignment configuration within said range of movement, said positional offset including a lateral and an elevational change of said electric object within said defined area;
    processing, by said processor, said positional offset to make one or more adjustments in real time;
    determining when said electric object is within the defined area in a specified position and issuing a confirmation command to the robot; and
    initiating, by a charging interface, responsive to the confirmation command, pairing of said electric object to a charging source to begin charging, wherein the robot aligns the charging source to a receptacle interface of the electric object.

2. The method according to claim 1, further comprising: computing, by said processor, a final offset once said electric object is stationary within the defined area.

3. The method according to claim 2, further comprising: sending said final offset for automated action by the robot.

4. The method according to claim 1, further comprising: aligning, by said robot, its planar datums to the planar datums of said electric object.

5. The method according to claim 1, wherein upon determining that one or more coplanar positions are realized, by said robot, sending a command indicating that a first cycle is completed and prompting initiation of charging from said power source.

6. The method according to claim 1, further comprising: continuously polling, by said processor including a supervisory-control module, the active-alignment configuration, to monitor in real time, positional data of said electric object relative to said active-alignment configuration.

7. The method according to claim 1, wherein said active-alignment configuration includes said plurality of sensors positioned at an EV-charging station including at least one component from a group of: a charging plug, a power grid, a facility meter, an energy controller, a software platform, and network-operating center, wherein the EV-charging station comprises a battery, a power-conversion system and executable code to operate web-based or mobile-based applications relating to the EV-charging station.

8. The method according to claim 1, wherein said plurality of sensors includes at least one radar sensor and wherein at least one sensor is positioned on a side of said electric object and at least a second sensor is positioned in front of said electric object.

9. The method according to claim 1, wherein said electric object comprises a charging receptacle configured to couple said electric object to said charging interface to receive a charge via an electrical connection established between said electric object and said charging interface.

10. The method according to claim 1, whether said plurality of sensors are positioned to specify said defined area, said plurality of sensors spaced apart and said plurality of sensors including at least four radar sensors.

11. An alignment-and-pairing system for automatically aligning and pairing an electric vehicle for receiving charge from a power source, comprising:
    a computer coupled by a bus to an input-and-output interface;
    a data storage and a network interface coupled to the computer;
    a memory with executable code coupled to the computer, wherein the executable code causes the computer to execute one or more actions by:
    an active-alignment module comprising a plurality of sensors positioned to capture approximate positioning of the electric vehicle within a defined area specifying a range of movement for automated action by a robot within the range of movement, by dynamically measuring one or more changes along a plurality of three-dimensional planes in the defined area, the active-alignment module detecting arrival of the electric object within the range of movement in an instance the electric object positions within the defined area;
    a supervisory-control module coupled to said active-alignment module and controlling the robot to execute the automated action, said supervisory-control module calculating a positional offset of said electric vehicle relative to three-dimensional planes within the range of movement and providing the positional offset to the robot to execute the automated action, said positional offset including a lateral and an elevational change of said electric vehicle within said defined area; and a vehicle-control module coupled to said supervisory-control module, said vehicle-control module receiving said positional offset and determining adjustments in real time required for said electric vehicle and issuing commands to effect said adjustments via the robot; and a charging interface coupled to said vehicle-control module, said charging interface receiving a final command from said vehicle-control module and initiating pairing of said electric vehicle to a charging source to begin charging.

12. The alignment-and-pairing system according to claim 11, wherein said vehicle-control module determines a final offset once said electric vehicles is determined to be stationary and sends the final offset to the robot via a robot-assisted-alignment control.

13. The alignment-and-pairing system according to claim 12, wherein said vehicle-control module determines said final offset for automated action by the robot.

14. The alignment-and-pairing system according to claim 11, further comprising:

an action from the robot aligning planar datums of the robot to the planar datums of said electric vehicle.

15. The alignment-and-pairing system according to claim 11, wherein upon determining that one or more coplanar positions are realized, by said robot, sending a command indicating that a first cycle is completed and prompting initiation of charging from said power source.

16. The alignment-and-pairing system according to claim 11, wherein said supervisory-control module continuously polls in real time for positional data of said electric object relative to a plurality of three-dimensional planes.

17. The alignment-and-pairing system according to claim 11, wherein said active-alignment module includes said plurality of sensors positioned at an EV-charging station including at least one component from a group of: a charging plug, a power grid, a facility meter, an energy controller, a software platform, and a network-operating center, wherein the EV-charging station comprises a battery, a power-conversion system and executable code to operate web-based or mobile-based applications relating to EV-charging station.

18. The alignment-an-paring system according to claim 11, wherein said plurality of sensors are radar sensors and wherein at least one radar sensor is positioned on one side of said electric vehicle when said electric vehicle drives in and is positioned to receive a charge and at least a second radar sensor is positioned in front of said electric vehicle.

19. The alignment-and-pairing system according to claim 11, wherein said electric vehicle comprises a charging receptacle configured to couple said electric vehicle to said charging interface to receive a charge via an electrical connection established between said electric vehicle and said charging interface.

20. The alignment-and-pairing system according to claim 11, wherein said plurality of sensors are positioned to define said area, said plurality of sensors spaced apart and said plurality of sensors including at least four radar sensors.

\* \* \* \* \*